Dec. 26, 1944.    R. A. HINKLEY ET AL    2,365,955
GLASS PRESS
Filed June 3, 1941
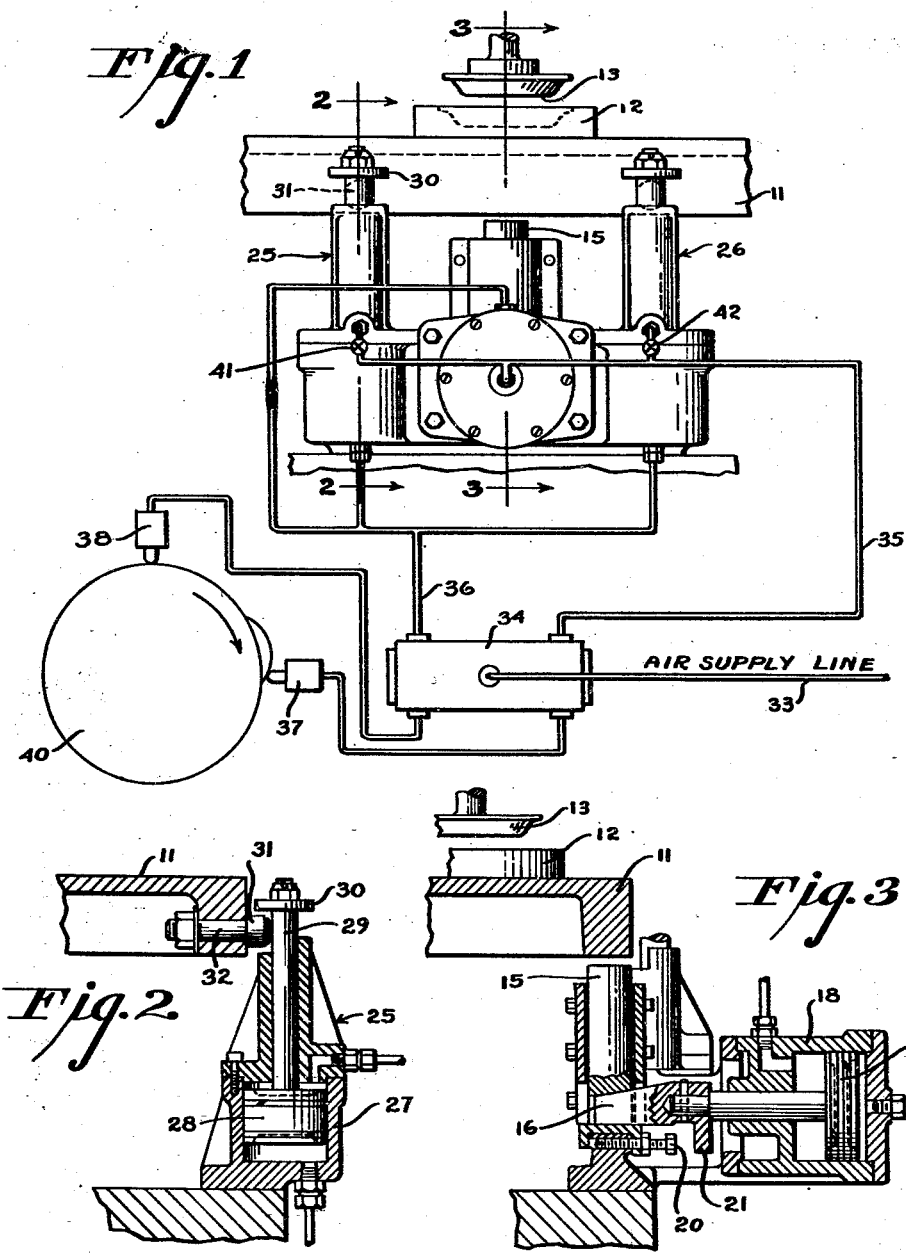
Inventors
RAY A. HINKLEY
AND ROBERT L. MEIKLE
F. H. Knight
Attorney Patented Dec. 26, 1944

2,365,955

UNITED STATES PATENT OFFICE 2,365,955

GLASS PRESS

Ray A. Hinkley and Robert L. Meikle, Corning, N. Y., assignors to Corning Glass Works, Corning, N. Y., a corporation of New York Application June 3, 1941, Serial No. 396,475

4 Claims. (Cl. 49—37)

The present invention relates to glass forming presses and has particularly to do with a method of and apparatus for holding a mold support level and rigid while an article is being pressed, and also while the pressing plunger is being withdrawn from the mold.

Presses in general use today to which applicants' invention may be advantageously applied include a circular table mounted for rotation about a vertical axis and carrying a series of press molds about its periphery which are successively indexed beneath a pressing plunger after the receipt of a mold charge, provided by a suitable feeder.

The mold table employed usually comprises a heavy casting loosely supported at its center in a substantially level position. To ensure that the table will remain level during the downward thrust of the pressing plunger, an anvil is often arranged adjacent the under side of the table at the pressing position. This anvil, if adjusted to rubbing contact with the bottom of the table surface, successfully takes the thrust of the pressing plunger and thus prevents downward movement of the table. However, such adjustment of the anvil has the objection of introducing excessive drag on the table and excessive wear on the anvil, so that additional power is required to rotate the table, and the wear on the anvil under this operating condition is rather rapid requiring frequent raising of the anvil. Attempt is sometimes made to so set the anvil that there is a very slight clearance between it and the table, but this practice is not a solution to the above difficulty because the table warps to some extent during use and setting of the anvil clear of the lowermost surface of the table passing thereover usually results in too much clearance in certain portions and consequent excessive tilting of the table. Also, it has been found that it is important to prevent upward tilting of the table when the plunger is being withdrawn from the mold because such movement introduces a side thrust of the plunger into the upper edge of the article. If the glass in the upper edge of the article is fully hardened by this time, this side thrust if excessive introduces checks in the ware. If the glass has not fully hardened, it distorts it from the initially pressed shape.

An object of the present invention is a method of holding a first movable element of a pressing assembly rigid while taking the thrust of a second unit of such assembly and of also holding one of the elements against movement thereafter until the other of the elements has been dissociated therefrom.

Another object of the invention is a structural arrangement whereby the foregoing method may be exercised.

A further object is an apparatus for holding one unit of a pair of pressing elements level and rigid while subjected to the thrust of the other unit of the pair.

A still further object is an apparatus for holding a mold level and rigid while subjected to the thrust of a pressing plunger.

Still another object is an apparatus for holding a mold level and rigid while a pressing plunger is being withdrawn from a pressed article within the mold.

Other and further objects of the invention will become apparent from a reading of the following description of a preferred form of the invention illustrated in the accompanying drawing where the invention is shown applied to a conventional form of table press wherein the table successively indexes the molds carried thereby under a pressing plunger.

Fig. 1 is a side elevational view showing a fragment of the table of a glass press with a mold thereon oriented under a pressing plunger and with a table holding mechanism embodying the invention associated with the table;

Fig. 2 is a sectional view taken on lines 2—2 of Fig. 1; and

Fig. 3 is a sectional view taken on lines 3—3 of Fig. 1.

In the drawing the table 11 is shown as just having indexed a mold 12 under the pressing plunger 13. A movable anvil 15 is arranged below and spaced from the table 11 and is adapted to be raised by a wedge 16 to the position required to hold the table level while the mold 12 is being subjected to the downward thrust of the plunger 13. The wedge 16 is operated to raise and lower the anvil 15 by a piston 17 operated by air supplied to its cylinder 18. The elevation of the anvil 15 to the exact height desired is ensured by adjustment of a wedge stop screw 20 cooperative with a depending lug 21 of the wedge 16.

Arranged on opposite sides of the anvil 15 adjacent the periphery of table 11 are table hold-down units 25 and 26. These units are alike and cooperate with the table in like manner and accordingly only unit 25 will be described.

The hold-down unit 25 comprises a cylinder 27 containing a piston 28. This piston carries a table hold-down rod 29 equipped at its free end with a hardened steel washer 30 arranged above the path of travel of a bolt head 31 of a bolt 32 carried by table 11 and so located that when mold 12 is under plunger 13 the bolt head 31 is under the washer 30.

The upper ends of the cylinders of table hold-down units 25 and 26 and the right hand end of cylinder 18 are supplied with operating air from a supply line 33 via a control valve 34 and pipe 35 while such valve exhausts the opposite ends of these cylinders to atmosphere via a pipe 36 and exhaust ports (not shown) of the control valve. The valve 34 alternatively, in a similar fashion, supplies air from line 33 to the end of cylinder 18 and of the cylinders of units 25 and 26 via pipe 36 and exhausts the ends of cylinders with which pipe 35 is connected to atmosphere via the exhaust ports of the valve. The valve 34 is under control of bleeder valves 37 and 38 which are alternately operated by a cam 40 which is driven by the same mechanism which controls the feeding and indexing of the press. It is desirable that the downward movement of the hold-down units be delayed slightly so as not to interfere with the raising of anvil 15. To accomplish this valves 41 and 42 are included in the branches of pipe 35 which feed air to the upper ends the cylinders of units 25 and 26 and are partly closed to slightly delay the downward movement of their pistons.

The drawing shows the position of the parts just after alignment of mold 12 with the pressing plunger 13. Air is still being supplied to the lower ends of the cylinders of units 25 and 26 and to the left hand end of cylinder 18 from a previous operation, but bleeder valve 37 has started to open to effect an operation of control valve 34 which an instant later will supply air to pipe 35 and exhaust pipe 36 to atmosphere and thus cause piston 17 to raise anvil 15 and units 25 and 26 to bear down on the bolt heads 31 to hold the table rigid. The usual pressing cycle is initiated following the operation of units 25 and 26 and is completed by the time that cam 40 encounters bleeder valve 38. As will be well understood restoration of anvil 15 and units 25 and 26, under control of bleeder 38, is arranged to occur just before a further indexing movement of the table 11 is initiated.

From the foregoing it will be appreciated that applicants have provided a simple apparatus for effectively holding a mold level and rigid while an article is being pressed and which also remains rigid while the plunger is being withdrawn from the ware. Obviously, the foregoing results may be accomplished by various modifications of the equipment shown within the scope of applicants' invention.

What is claimed is:

1. The combination with a glass pressing apparatus which includes a movable table having a series of molds thereon successively indexed under a pressing plunger and wherein the plunger then performs a pressing cycle, of a support for taking the thrust given the table as a charge of glass within the mold is being pressed and of means for clamping the table tightly against said support during the entire pressing cycle of the plunger.

2. The combination with a glass press having mold table equipped with a series of molds about its periphery and a pressing plunger under which the molds are successively indexed by rotation of the table, of a movable support spaced from the underside of the section of the table oriented under the pressing plunger and of hold-down devices associated with the peripheral portions of the table at opposite sides of said support, means for elevating said support to a desired height to support the adjacent section of the table during a pressing cycle and means for actuating said hold-down devices to hold the table in engagement with said support during a pressing cycle.

3. In a glass pressing apparatus the combination with a support equipped with a series of molds adapted to be successively indexed under a pressing plunger, and the plunger operated through a pressing cycle to press a charge of glass contained in the indexed mold, of means for successively clamping the section of the support oriented under the plunger in a predetermined position while the plunger is being actuated, said means including an anvil having associated mechanism for elevating it to a predetermined height in accordance with that at which it is desired to hold the associated table section and also including hold-down devices having associated mechanisms for clamping the section of the table associated with the anvil tightly against it and means for rendering said mechanisms active.

4. The combination with a glass pressing apparatus which includes a pressing plunger, a movable table having a series of molds thereon which are successively indexed to pressing position and in which the plunger performs a pressing cycle, of a table support adjacent the pressing plunger for taking the thrust given the table during pressing and of hold-down means operatively associated with said table for restraining the table against upward movement with the plunger while the plunger is being withdrawn from a mold.

RAY A. HINKLEY.
ROBERT L. MEIKLE.